(12) United States Patent
Col et al.

(10) Patent No.: US 6,442,673 B1
(45) Date of Patent: Aug. 27, 2002

(54) UPDATE FORWARDING CACHE FOR ADDRESS MODE

(75) Inventors: Gerard M. Col; Terry Parks, both of Austin, TX (US)

(73) Assignee: I.P. First L.L.C., Fremont, CA (US)

( * ) Notice: Subject to any disclaimer, the term of this patent is extended or adjusted under 35 U.S.C. 154(b) by 0 days.

(21) Appl. No.: 09/434,086

(22) Filed: Nov. 5, 1999

(51) Int. Cl.[7] ................................................. G06F 9/38
(52) U.S. Cl. ...................... 712/202; 712/216; 711/118
(58) Field of Search .................. 711/118, 132, 711/137, 140; 712/216, 202

(56) References Cited

U.S. PATENT DOCUMENTS

| | | | |
|---|---|---|---|
| 5,687,349 A | * | 11/1997 | McGarity |
| 5,701,426 A | * | 12/1997 | Ryan |
| 6,021,471 A | * | 2/2000 | Stiles et al. ................. 711/140 |
| 6,085,292 A | * | 7/2000 | McCormack et al. ....... 711/140 |
| 6,148,391 A | * | 11/2000 | Petrick ....................... 712/202 |

FOREIGN PATENT DOCUMENTS

EP   0 402 787 A2 * 12/1990

OTHER PUBLICATIONS

Lipasti et al., "Exceeding the Dataflow Limit via Value Prediction," *Proceedings of the 29th Annual IEEE/ACM International Symposium on Microarchitecture*, pp. 226–237, 1996.*

* cited by examiner

*Primary Examiner*—William M. Treat
(74) *Attorney, Agent, or Firm*—Richard K. Huffman; James W. Huffman

(57) ABSTRACT

An apparatus is presented for expediting the execution of address-dependent micro instructions in a pipeline microprocessor having design characteristics-complexity, power, and timing-that are not significantly impacted by the number of stages in the microprocessor's pipeline. The present invention provides a cache for storage of multiple intermediate address operands. The cache is accessed by an address-dependent micro instruction to retrieve a required address operand. The apparatus includes an update forwarding cache, address update logic, and address operand configuration logic. The update forwarding cache stores the intermediate address operands. The address update logic receives the intermediate address operands as they are generated and enters the intermediate address operands into the update forwarding cache. The address operand configuration logic accesses the intermediate address operands to configure and provide an address operand that is required an address-dependent micro instruction.

23 Claims, 6 Drawing Sheets

Utilization of Interlock Logic to Execute an Address-Dependent Micro Instruction

| Cycle | Translate | Register | Address | Data/ALU | Write Back |
|---|---|---|---|---|---|
| 1 | PUSH EAX | *** | *** | *** | *** |
| 2 | PUSH EBX | PUSH ESP | *** | *** | *** |
| 3 | *** | EAX | PUSH ESP | *** | *** |
| 4 | *** | slip | EAX | PUSH ESP | *** |
| 5 | *** | slip | slip | EAX | PUSH ESP |
| 6 | *** | PUSH ESP | slip | slip | EAX |
| 7 | *** | EBX | PUSH ESP | slip | slip |
| 8 | *** | *** | EBX | PUSH ESP | slip |
|  |  | *** | *** | EBX | PUSH ESP |
|  |  | *** | *** | *** | EBX |

2 cycles

FIG. 3 (Prior Art)

*Pipeline Microprocessor With Address Distribution Bus*

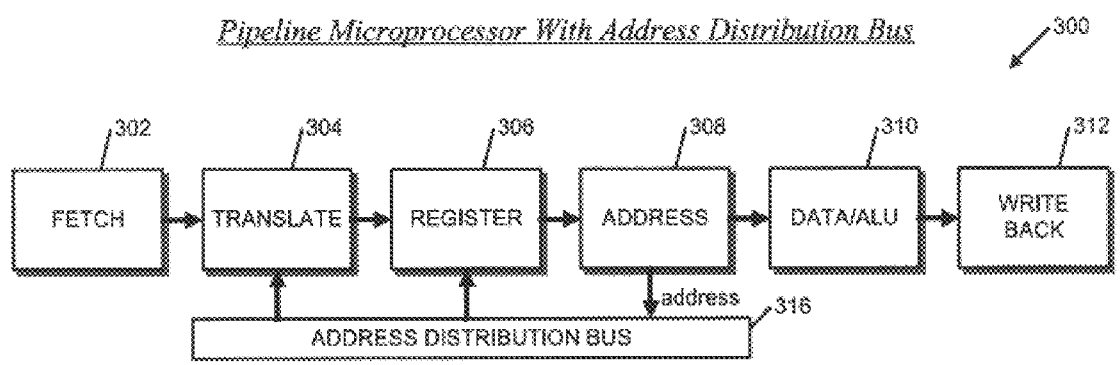

FIG. 4 (Prior Art)

*Use of Address Distribution Bus to Execute Address-Dependent Micro Instructions*

| Cycle | Translate | Register | Address | Data/ALU | Write Back |
|---|---|---|---|---|---|
| 1 | PUSH EAX | *** | *** | *** | *** |
| 2 | NOP | PUSH ESP EAX | *** | *** | *** |
| 3 | PUSH EBX | NOP | PUSH ESP EAX | *** | *** |
| 4 | POP EAX | PUSH ESP EBX | NOP | PUSH ESP EAX | *** |
| 5 | *** | POP EAX ESP | PUSH ESP EBX | NOP | PUSH ESP EAX |
| 6 | *** | *** | POP EAX ESP | PUSH ESP EBX | NOP |
| 7 | *** | *** | *** | POP EAX ESP | PUSH ESP EBX |
| 8 | *** | *** | *** | *** | POP EAX ESP |

*Utilization of Update Forwarding Cache to Execute an Address-Dependent Micro Instruction*

| Cycle | Translate | Register | Address | Load | Align | Execute | Store | Write Back |
|---|---|---|---|---|---|---|---|---|
| 1 | PUSH EBX | *** | *** | *** | *** | *** | *** | *** |
| 2 | NOP | PUSH ESP | *** | *** | *** | *** | *** | *** |
| 3 | NOP | EBX | PUSH ESP | *** | *** | *** | *** | *** |
| 4 | POP EAX | NOP | EBX | PUSH ESP | *** | *** | *** | *** |
| 5 | *** | NOP | NOP | EBX | PUSH ESP | *** | *** | *** |
| 6 | *** | POP EAX ESP | NOP | NOP | EBX | PUSH ESP | *** | *** |
| 7 | *** | *** | POP EAX ESP | NOP | NOP | EBX | PUSH ESP | *** |
| 8 | *** | *** | *** | POP EAX ESP | NOP | NOP | EBX | PUSH ESP |
| 9 | *** | *** | *** | *** | POP EAX ESP | NOP | NOP | EBX |
| 10 | *** | *** | *** | *** | *** | POP EAX ESP | NOP | NOP |
| 11 | *** | *** | *** | *** | *** | *** | POP EAX ESP | POP EAX ESP |

FIG. 8

UPDATE FORWARDING CACHE FOR ADDRESS MODE

BACKGROUND OF THE INVENTION

1. Field of the Invention

This invention relates in general to the field of instruction execution in computers, and more particularly to an apparatus in a pipeline microprocessor for providing address operands corresponding to recently executed micro instructions to address-dependent micro instructions.

2. Description of the Related Art

A microprocessor has an instruction pipeline that sequentially executes instructions from an application program in synchronization with a microprocessor clock. The instruction pipeline is divided into stages, each of which performs a specific task that is part of an overall operation that is directed by a programmed instruction. The programmed instructions in a software application program are executed in sequence by the microprocessor. As an instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is very much analogous to the manufacture of items on an assembly line.

Early pipeline microprocessors were not sophisticated so as to execute multiple instructions in different pipeline stages at the same time. Accordingly, a given instruction would be fetched from memory and would proceed through the pipeline stages until it completed execution. Following this, a next instruction would proceed through the pipeline stages through completion. And since early pipeline microprocessors had only a few pipeline stages, the inefficient utilization of stage resources was not deemed to be a significant encumbrance.

As uses for microprocessors began to proliferate however, more stringent requirements were imposed on microprocessor designers, particularly with respect to speed. And the obvious approach for increasing processing speed was to allow multiple instructions to simultaneously proceed down the pipeline at the same time. Clearly this improvement increased instruction throughput because resources within each pipeline stage were more efficiently used. But with this change came a problem: What if one instruction executing in an early pipeline stage required an operand that was yet to be provided by another instruction executing in a later pipeline stage? This predicament is in fact common to software programs; instructions that are close in proximity tend to perform tasks using the same operand. For example, a control algorithm may compute a true error signal value by adding a small number to a current error signal value and then comparing this value to some other signal that is input to the microprocessor. The structure of the algorithm is to add a first operand to a second operand to produce a result. The result is then tested to see if the computed value is tolerable. If not, then the first operand is added to the computed result to obtain a second result. The second result is tested. And so on. Even in this simple algorithm it is evident that every other instruction utilizes the last computed result. When a given instruction executing in one stage of the pipeline requires an operand that is to be generated or that is modified by another instruction executing in a subsequent stage of the pipeline, the given instruction is referred to as a dependent instruction. This is because the operand required by the dependent instruction depends upon generation of the operand by the other instruction.

Of interest for this application is a particular class of operand dependencies known as address dependency. More specifically, most present day microprocessors provide instructions for expediting storage of information in a memory stack. These stack instructions implicitly prescribe a top of stack memory location where new data is to be stored or from where most recently written data can be retrieved. Each time new data is written to the stack, an address operand pointing to the top of the stack must be modified to indicate a new top of stack. Otherwise, when subsequent data is written, the new data would be overwritten. Similarly, the address operand must be modified to account for retrieval of data from the stack. Stack instructions are very powerful for use by application programmers because they merely need specify what data is to be written, or pushed, onto the stack, or what is to be retrieved, or popped, off of the stack. Manipulation of the stack pointer address operand is performed automatically by logic within the microprocessor. Even in the simple case of two successive pop instructions, one skilled in the art will perceive that an address operand dependency case exists. The stack pointer is not available for use by the second pop instruction until it is written back into its address operand register by the first pop instruction.

To deal with address-dependent instructions, microprocessor designers added interlock logic to existing pipeline designs. The interlock logic spanned the stages of a microprocessor where the address dependencies could occur. During normal operation, non-dependent instructions were successively advanced through the pipeline stages in synchronization with the clock. When the interlock logic encountered an address-dependent instruction, it stalled execution of the address-dependent instruction by inserting slips into the pipeline until the address operand required by the address-dependent instruction was made available.

In spite of the advances provided through interlock logic, demands for faster throughput continued to press microprocessor designers. Consequently, an alternative to interlock logic was developed that allowed address-dependent instructions to proceed down the pipeline without incurring slips. This alternative is known as an address operand distribution bus. In essence, the address operand distribution bus originates at the stage of the pipeline in which address operands are modified. When an address operand is modified, it is copied to the bus and then routed to all of the earlier stages that are affected by address-dependent instructions. If an address-dependent instruction is present within any of the earlier stages, then logic within that stage performs all of the operations necessary to properly configure the required address operand from the provided intermediate address operand. The address distribution approach can be thought of as a one-to-many distribution scheme because one address operand can be distributed to several address-dependent instructions at the same time.

The address operand distribution scheme has prevailed as the principal technique for expediting the execution of address-dependent instructions, that is, until more recent times when demands for further throughput increases have compelled microprocessor designers to substantially alter the design of stages within the pipeline. These alterations to the pipeline can be comprehended through use of an assembly line analogy. Suppose an assembly line is set up with three stages, where each of the three stages is required to insert two screws in a product that flows down the line, for a total of six screws. Further suppose that the time required to insert a screw is one minute. To send a product through the assembly line, then, requires six minutes. If multiple products are sent down the line, then it follows that one product rolls off the line every two minutes.

A simple enhancement to the line will double the production throughput: Reconfigure the line into six stages, where each stage is required to insert only one screw. While with this architectural change it still takes six minutes to pass a product through the line, the improvement now is that one product rolls off of the line every minute.

The speed and throughput are doubled by doubling the number of stages and halving the operations performed in each stage.

To improve the throughput of current microprocessors, designers are taking the very same approach: pipeline stages are being added and the functional requirements for each stage are being decreased. Thus, faster clock speeds can be applied and instruction throughput is increased.

But increasing the number of pipeline stages has highlighted a deficiency with the result distribution technique for dealing with dependent instructions. Whereas early microprocessor pipelines consisted of only a few stages, the attendant logic required to implement an address operand distribution bus was not much of an issue. But for every added stage in the execution pipeline, an additional set of address operand distribution logic must be provided.

In other words, the logic required to implement an address operand distribution bus is directly proportional to the number of stages to which the address operand is to be distributed. Substantially more stages also require that logic elements for driving the address operand signals must be more powerful. Moreover, the timing to distribute address operands to multiple pipeline stages is not only a function of the number of stages, but is also a based upon the location of the stage that is physically farthest from the origination stage. Hence, circuit complexity, power, and timing problems arise when an address operand distribution scheme is applied to pipeline architectures that have many pipeline stages.

Therefore, what is needed is an apparatus in a pipeline microprocessor that allows address-dependent instructions to execute without delay, but which is not adversely affected by the number of stages in the microprocessor pipeline.

In addition, what is needed is a mechanism to provide address-dependent micro instructions with generated address operands that does not require additional sets of logic, or exhibit timing problems when employed in a pipeline microprocessor having multiple pipeline stages.

Furthermore, what is needed is an apparatus in a pipeline microprocessor for temporarily storing several intermediate address operands that can be accessed in a single pipeline stage by an address-dependent micro instruction.

SUMMARY

To address the above-detailed deficiencies, it is an object of the present invention to provide a mechanism for expeditiously executing address-dependent instructions that can adapt, without adverse hardware, power consumption, or timing consequences, to advanced pipeline architectures having more pipeline stages.

Accordingly, in the attainment of the aforementioned object, it is a feature of the present invention to provide a microprocessor apparatus for providing an address operand to an address-dependent micro instruction. The microprocessor apparatus includes an update forwarding cache, address update logic, and address configuration logic. The update forwarding cache stores intermediate address operands. The address update logic is coupled to the update forwarding cache and enters the intermediate address operands into the update forwarding cache. The address configuration logic is coupled to the update forwarding cache and accesses the intermediate address operands to provide the address operand required by the address-dependent micro instruction.

An advantage of the present invention is that only minimal changes are required to provide address operands to address-dependent instructions when pipeline stages are added.

Another object of the present invention is to provide an apparatus for executing address-dependent instructions without delay that is less complex than has heretofore been provided.

In another aspect, it is a feature of the present invention to provide an intermediate address operand cache for storing intermediate address operands calculated by preceding micro instructions, where the intermediate address operands are entered into the intermediate address operand cache prior to being entered into a register file. The intermediate address operand cache has address operand buffers, tag buffers, valid word indicators, a word selector, and address operand configuration logic. The address operand buffers store the intermediate address operands. The tag buffers are coupled to the address operand buffers. Each of the tag buffers designates a corresponding register in the register file within which a corresponding intermediate address operand is to be entered. The valid word indicators are coupled to the address operand buffers. Each of the valid word indicators indicates which words in a corresponding intermediate address operand buffer are valid upon entry of the corresponding intermediate address operand. The word selector is coupled to the tag buffers and the valid word indicators. The word selector determines selected word locations within selected address operand buffers that are used to configure an address operand for an address-dependent micro instruction. The address operand configuration logic is coupled to the word selector and the address operand buffers. The address operand configuration logic retrieves words from the selected word locations within the selected address operand buffers to configure the address operand.

Another advantage of the present invention is that a mechanism for expediting the execution of address-dependent instructions is provided that is well-suited for multi-stage pipeline designs.

A further object of the invention is to provide a mechanism for accessing address operands in a single pipeline stage whereby an address-dependent instruction can execute without incurring slips.

In a further aspect, it is a feature of the present invention to provide an apparatus in a pipeline microprocessor for providing an address operand to an address-dependent micro instruction. The apparatus includes address calculation logic, address operand cache entries, address update logic, and address operand configuration logic. The address calculation logic generates intermediate address operands corresponding to micro instructions that precede the address-dependent micro instruction. The address operand cache entries store the intermediate address operands. The address update logic is coupled to the address calculation logic and the address operand cache entries. The address update logic enters a specific intermediate address operand into a specific address operand cache entry following calculation of the specific intermediate address operand by the address logic and prior to the specific intermediate address operand being written to a specific address operand register in a register file. The address operand configuration logic is coupled to the address operand cache entries and selects words from selected address operand cache entries to configure the address operand.

A further advantage of the present invention is that provision of address operands to address-dependent instructions can be accomplished in more advanced pipeline microprocessors without incurring problems related to circuit complexity, routing, power, or timing.

BRIEF DESCRIPTION OF THE DRAWINGS

These and other objects, features, and advantages of the present invention will become better understood with regard to the following description, and accompanying drawings where:

FIG. 3 is a block diagram illustrating stages of a related art pipeline microprocessor that employs an address distribution bus to preclude pipeline slips.

FIG. 4 is a table illustrating execution of two address-dependent micro instructions by the microprocessor of FIG. 3.

FIG. 8 is a table illustrating execution of an address-dependent micro instruction by the microprocessor of FIG. 6.

DETAILED DESCRIPTION

In light of the above background on techniques for executing micro instructions in a pipeline microprocessor, several related art examples will now be discussed with reference to FIGS. 1 through 5. These examples illustrate how present day techniques for distributing intermediate address operands to address-dependent micro instructions cause significant problems when applied to more recent pipeline architectures, particularly those architectures having numerous pipeline stages. Following this discussion, a detailed description of the present invention will be provided with reference to FIGS. 6 through 8. The present invention provides an apparatus that allows address-dependent micro instructions to access interim address operands. In contrast to conventional address operand distribution schemes, the present invention has beneficial attributes in terms of complexity, timing, power consumption, and drive strength, that are essentially unaffected by the number of stages in the pipeline.

Figures 1, 2:
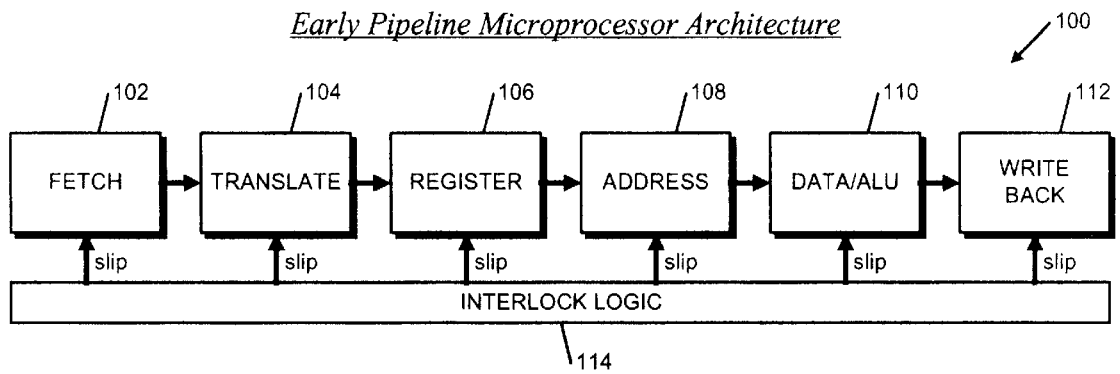
FIG. 1 is a block diagram illustrating stages of a related art pipeline microprocessor.
FIG. 2 is a table illustrating execution of an address-dependent micro instruction by the microprocessor of FIG. 1.

Referring to FIG. 1, a block diagram is presented illustrating stages of a related art pipeline microprocessor 100 that is exemplary of early microprocessor pipeline designs. The microprocessor 100 includes a fetch stage 102, translate stage 104, register stage 106, address stage 108, data/ALU stage 110, and write back stage 112. In addition, interlock logic 114 is shown coupled to all of the stages 102–112.

Operationally, the fetch stage 102 fetches instructions from memory (not shown) that are to be executed by the microprocessor 100. The translate stage 104 sequentially translates, or decodes, the fetched instructions into associated micro instructions, each micro instruction directing logic resources within subsequent stages of the microprocessor 100 to perform a specific subtask related to accomplishment of an operation prescribed by a fetched macro instruction. The register stage 106 retrieves operands specified by the micro instructions from a register file (not shown) for use by subsequent stages in the pipeline. The address stage 108 calculates memory addresses specified by the micro instructions to be used in data storage and retrieval operations. The data/ALU stage 110 either performs arithmetic logic unit (ALU) operations on data retrieved from the register file, or reads data from memory using the memory address calculated in the address stage 108, or writes data to memory using the memory address calculated in the address stage 108. The write back stage 112 updates registers in the register file with results generated or retrieved by the data/ALU stage 110. Together, the stages of the microprocessor 100 that execute micro instructions are together referred to a execution stages 106–112, or the execution pipe 106–112. Thus, macro instructions are fetched by the fetch stage 102, they are decoded into micro instructions by the translate stage 104, and the micro instructions proceed sequentially through the execution stages 106–112 of the microprocessor 100.

Micro instructions move through the execution stages 106–112 of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, the interlock logic 114 temporarily stalls flow of micro instructions through the microprocessor pipeline: preceding stages in the pipeline are precluded from forwarding operands down the pipeline and succeeding stages, having completed execution of a current micro instruction, sit idle. A stall in the pipeline is referred to as a slip or a void. Slips cause delays when application programs execute on the microprocessor 100.

One case where the interlock logic 114 insert slips into the pipeline arises occurs when a second micro instruction follows a first micro instruction in the execution order and the second micro instruction in addition requires an address operand from the register stage 106 in order to compute an address in the address stage 108. But in addition the same address operand is to be modified as a result of an address computation performed when the first micro instruction proceeds through the address stage 108. Yet, when the second micro instruction enters the register stage 106 to fetch the address operand from the register file, the first micro instruction, although it may have already proceeded through the address stage 108, has not yet written the modified address operand back into its corresponding register in the register file. This is because the first micro instruction has not proceeded through the write back stage 112. In the example shown in FIG. 1, such a case can occur when the first micro instruction is in the data/ALU stage 110 when the second micro instruction proceeds through the register stage 106. For this reason, the second micro instruction is called an address-dependent micro instruction because its address operand required for computation of an address in the address stage 108 depends upon successful execution of a preceding micro instruction-in this case the first micro instruction-which has not yet written its modified address operand back into the register stage 106. Thus, when an address-dependent micro instruction is generated by the translate stage 104, the interlock logic 114 continues to insert slips into the execution pipe to stall execution of the address-dependent micro instruction until its required address operand has been written back into the register file by the preceding micro instruction. Execution of an address-dependent micro instruction is more specifically discussed with reference to FIG. 2.

Referring to FIG. 2, a table 200 is presented illustrating execution of an address-dependent micro instruction by the microprocessor 100 of FIG. 1. Two macro instructions, a first macro instruction, designated PUSH EAX, and a second macro instruction, designated PUSH EBX, are shown in the Translate column of the table 200. For clarity of discussion, a column corresponding to the fetch stage 102 is not shown. The marks *** designate instructions before or after the instructions of interest. Progression of instructions through noted stages of the pipeline is shown with respect to cycles of a pipeline clock.

The two macro instructions depicted in FIG. 2 are representative of a particular class of instructions, stack instructions, which are common to virtually every present day pipeline microprocessor that utilizes a stack for manipulation of data entities. A stack is a designated area of memory that the microprocessor 100 reads and writes by executing designated stack instructions. The data entities are stored in sequentially addressed locations in the stack and the address of the location pointing to the most recently stored data entity is called the top of the stack. In an x86-compatible microprocessor, these stack instructions are referred to as PUSH and POP instructions. A PUSH instruction stores a prescribed operand on the top of the stack. A POP instruction retrieves an operand from the top of the stack. The top of the stack is referenced by an address operand in the register file called a stack pointer. Each time the stack is written, logic in the address stage 108 modifies the value of the stack pointer so that it correctly designates the top of stack pointer following the PUSH operation. Likewise, the stack pointer is modified to correctly designate the top of stack following a POP operation.

The stack pointer is stored in a designated register in the register stage 106 and is prescribed in this example as register ESP. Register ESP is explicitly prescribed by corresponding stack micro instructions shown in the Register column of the table 200. Because the stack pointer is used to compute the address of a memory location within the stack, the stack pointer is thus modified by address logic each time a stack micro instruction proceeds through the address stage 108. One skilled in the art will appreciate that there is another class of macro instructions that modify address operands (i.e., operands used to calculate an address in memory) in the address stage 108 as well as stack instructions. This other class of instructions is known as string instructions. Although string instructions do not employ the stack per se, manipulation of their associated address operands by address logic is similar to that associated with stack instructions in that the address operands for string instructions are also modified during execution of the string micro instructions in the address stage 108. It is beyond the scope of this application to provide a comprehensive discussion of the specific microprocessor instructions in use today that modify address operands in the address stage, however, it is sufficient to note that a typical present day pipeline microprocessor 100 employs one or more classes of instructions having address operands where, during execution of the instructions, the address operands are modified by address logic in the address stage 108. Once an address operand is modified by the address logic, it is not available to be used by a following instruction until the modified address operand is written back into its associated register (in this example, register ESP) in the register stage 106.

During cycle 1, the first stack macro instruction, PUSH EAX, proceeds through the translate stage 102. Therein, the first stack macro instruction is decoded into a first stack micro instruction, designated as PUSH ESP EAX. More specifically, an opcode field, PUSH, prescribes the operations that the execution stages 106–112 are to perform, that is, to fetch the contents of a source register, EAX, in the register file, and to store the fetched contents in the stack location designated by the contents of register ESP. The first stack micro instruction explicitly prescribes a source register tag, EAX, and a destination register tag, ESP. For the PUSH instruction, the source tag specifies that an operand to be fetched resides in register EAX in the register file. The destination tag, ESP, specifies that the contents of register EAX are to be stored in the data/ALU stage 110 in a memory location (i.e., the top of the stack) that is pointed to by the contents of register ESP (i.e., the stack pointer).

During cycle 2, the first stack micro instruction proceeds through the register stage 106. Therein, the source operand and address operand are retrieved from registers EAX and ESP in the register file. Also during cycle 2, the second stack macro instruction, PUSH EBX, proceeds through the translate stage. Therein, it is translated into a second stack micro instruction, designated as PUSH ESP EBX. Like the first stack micro instruction, the second stack micro instruction has an opcode field, PUSH, a destination tag ESP, and a source tag, EBX. Note at this point that although the second stack micro instruction specifies a source operand, EBX, different from that of the first stack micro instruction, the destination tag (ESP) is the same as that of the first stack micro instruction. Thus, the second stack micro instruction is an address-dependent micro instruction because its address operand depends upon manipulation of register ESP by the first stack micro instruction.

During cycle 3, the first stack micro instruction proceeds through the address stage 108. Therein, the address stage logic uses the contents of the stack pointer register (ESP) to generate an address for the top of the stack, which will be used by the data/ALU stage 110. In addition, in the address stage 108, the address logic changes the, value of the stack pointer to point to a new top of stack. Some microprocessors increase the stack pointer by the number of bytes required to store the source operand, other microprocessors decrease the stack pointer. For the purposes of discussion herein, one skilled in the art will appreciate that it is inconsequential whether the pointer is increased or decreased. What is important to note is that the contents of the stack pointer are changed during this cycle by logic in the address stage 108. Optimally, it is desired that the second stack micro instruction proceed through the register stage 106 during cycle 3. But because the modified stack pointer that is required to compute the new top of stack has not yet been written to register ESP, the interlock logic 114 inserts a slip into the pipeline, thus stalling execution of the address-dependent micro instruction.

During cycle 4, the first stack micro instruction proceeds through the data/ALU stage 110. Therein, the contents of register EAX are stored in the memory location prescribed by the contents of register ESP. And since the modified stack pointer is not yet written back to register ESP in the register file, the interlock logic 114 again inserts a slip into the pipeline to preclude the address-dependent micro instruction from proceeding.

During cycle 5, the first stack micro instruction proceeds through the write back stage 112. Therein, the modified address operand, the new stack pointer, is written back into the destination register, register ESP, in the register file. At this point, execution of the first stack micro instruction is completed. One skilled in the art will appreciate that some microprocessor architectures support reading of a register in the register file by an instruction in the register stage 106 during the same cycle that it is written by another instruction in the write back stage 112. Hence, also during cycle 5, because the address operand required by the second stack micro instruction is now available in register ESP, the second stack micro instruction is allowed to proceed through the register stage 106. Therein, the address-dependent operand is retrieved from register ESP and a second source operand is retrieved from register EBX.

During cycles 6 through 8, the second stack micro instruction proceeds through the remaining stages 108–112 of the microprocessor in the same manner as the first stack micro instruction, the difference being that 1) the contents of register EBX are stored on the stack and 2) pointer ESP points to a location adjacent to the location where the contents of register EAX were stored during execution of the first stack micro instruction.

Note that two pipeline slips are required to prevent the second stack micro instruction from prematurely proceeding into the register stage 106.

Although stalling address-dependent micro instructions is a principal function of the interlock logic 114, microprocessor designers have observed that a significant number of address dependencies exist in most application programs, primarily because application programs tend to store and retrieve multiple operands at the same time. That is, the application programs exhibit instructions sequentially to store a first operand, a second operand, a third, and so on. Alternatively, the application programs exhibit instructions sequentially to retrieve a first operand, a second operand, a third, etc. Consequently, to eliminate delays in the execution of application programs when executing these types of instructions, microprocessor designers have developed techniques that specifically expedite the execution of address-dependent micro instructions. One such technique, intermediate address operand distribution, is more specifically described with reference to FIG. 3.

Referring to FIG. 3, a block diagram is presented illustrating stages of a related art pipeline microprocessor 300 that employs an address distribution bus 316 to preclude pipeline slips. The microprocessor 300 includes a fetch stage 302, translate stage 304, register stage 306, address stage 308, data/ALU stage 310, and write back stage 312. In addition, an address distribution bus 316 is shown coupled to stages 304 through 308.

In operation, the pipeline stages 302–312 of the microprocessor 300 in FIG. 3 function like corresponding stages 102–112 of the microprocessor 100 discussed with reference to FIG. 1, the hundreds digit being replaces with a 3. However, the microprocessor 300 of FIG. 3 has been provided with an address distribution bus 316 to expedite the execution of address-dependent micro instructions. As noted above, address operands corresponding to stack and string instructions are modified in the address stage 308, but are not written back into a register file (not shown) in the register stage 306 until a micro instruction proceeds through the write back stage 312. The purpose of the address operand distribution bus 316 is to provide a means whereby an address-dependent micro instruction can proceed through the execution pipe 306–312 without incurring slips due to the unavailability of an address operand. The address-dependent micro instruction is designated as such and is permitted to proceed ahead. Because it is an address-dependent micro instruction that has been allowed to proceed, as it advances through the register stage 306, its address operand is not going to be present in the register file. This is by definition. Yet at some point a preceding micro instruction will modify the required address operand. And because the address operand is not yet written back to the register file, it is referred to as an intermediate address operand. Thus, when the intermediate address operand is generated by the preceding micro instruction, it is placed out on the address distribution bus 316 along with a destination tag designating its destination register in the register file. Logic within each of the stages 304–306 to which the intermediate address operand is distributed compares the destination tag on the bus 316 to the source register tags for corresponding micro instructions within each stage 304–306. If the destination tag does not match the source register tag for a given micro instruction, then the given micro instruction is not address-dependent; it thus proceeds to the next stage of the pipeline with its operands intact. If, on the other hand, the destination tag matches the source tag for a given micro instruction, then the given micro instruction is indeed dependent; the intermediate address operand is then provided to the address-dependent micro instruction via the address distribution bus 316.

When employing an address operand distribution scheme, it is significant to note that when a preceding micro instruction generates an intermediate address operand and places it out on the address distribution bus 316, a corresponding address-dependent micro instruction may be either in the translate stage 304 or the register stage 306. Consequently, logic (not shown) is provided within each of the stages 304–306 to match register tags and substitute intermediate address operands. Furthermore, a given intermediate address may be required by more than one address-dependent micro instruction. In this case, when the intermediate address operand is modified in the address stage 308, it must be distributed to more than one pipeline stage.

The span of the address distribution bus 316 in FIG. 3 is geared toward an implementation that substitutes an intermediate address operand for operands in a pipeline stage 304–306 immediately prior to entering a following stage. One skilled in the art will appreciate that if a particular implementation substitutes intermediate address operands when an address-dependent micro instruction immediately enters a pipeline stage, then the address distribution bus must span stages 306–308 rather than stages 304–308. Utilization of the address distribution technique to expedite execution of two address-dependent micro instructions is more specifically discussed with reference to FIG. 4.

Referring to FIG. 4, a table 400 is presented illustrating execution of two address-dependent micro instructions by the microprocessor of FIG. 3. Four macro instructions, a first macro instruction, designated PUSH EAX, a second macro instruction, designated NOP, a third macro instruction, designated PUSH EBX, and a fourth macro instruction, designated POP EAX, are shown in the Translate column of the table 400. The push and pop stack operations specified by the first, third, and fourth macro instructions in FIG. 4 all require access to a stack pointer address operand stored in register ESP in the register file. Therefore, like the macro instructions described with reference to FIG. 2, PUSH EAX, PUSH EBX, and POP EAX are shown to represent two address operand dependency cases typical to any present day microprocessor instruction set. The second macro instruction, NOP, prescribes a non-operation, similar in function to an intentionally programmed slip in the pipeline. It has been inserted between PUSH EAX and PUSH EBX in the sequence to highlight the fact that an address-dependent micro instruction need not necessarily immediately follow a micro instruction that is to generate an intermediate address operand which is required by the address-dependent micro instruction. For clarity of discussion, a column corresponding to the fetch stage 302 is not shown in the table 400. The marks *** designate instructions before or after the instructions of interest. Progression of instructions through the noted stages of the pipeline is shown with respect to cycles of a pipeline clock.

During cycle 1, the first macro instruction, PUSH EAX, proceeds through the translate stage 302. Therein, the first macro instruction is decoded into a first micro instruction, designated as PUSH ESP EAX. More specifically, an opcode field, PUSH, directs the microprocessor 300 to execute a push operation on the stack. The first micro instruction also prescribes a destination tag, ESP, and a source register tag, EAX. The source tag, S3, specifies that an operand to be pushed on the stack by the first micro instruction resides in register EAX of the register file. The destination tag, ESP, specifies an address operand register in the register file whose contents indicate the top of the stack location in memory.

During cycle 2, the first micro instruction proceeds through the register stage 306. Therein, the source operand and the address operand are retrieved from registers EAX and ESP in the register file. Also during cycle 2, the second Macro instruction, NOP, proceeds through the translate stage 304. Therein, it is translated into a NOP micro instruction, designated as NOP.

During cycle 3, the first micro instruction proceeds through the address stage 308. Therein, address logic within the address stage 308 employs the address operand fetched from register ESP to generate an address for the top of the stack. Following generation of the top of stack address, the address operand is modified to point to a new top of stack location. Although the address operand is modified in this stage of the pipeline, it will not be written back into the register file until the first micro instruction proceeds through the write back stage 312. However, because the microprocessor 300 of FIG. 3 employs an address distribution bus 316, the address stage 308 places the intermediate address operand out on the address distribution bus 316 so that any dependent micro instructions in previous stages of the pipeline can retrieve it. In addition during cycle 3, the second micro instruction, NOP, proceeds through the register stage 306. Furthermore during cycle 3, the third macro instruction, PUSH EBX, proceeds through the translate stage 304. Therein, it is translated into a third micro instruction, designated as PUSH ESP EBX. Like the first micro instruction, the third micro instruction has an opcode field, PUSH, an address operand tag, ESP, and a source register tag, EBX. Note at this point that the third micro instruction requires the contents of ESP in order to compute an address for the top of stack where the contents of register EBX are to be stored. Thus, the third micro instruction is an address-dependent micro instruction because its address operand depends upon the modification of the stack pointer (ESP) by the first micro instruction. Accordingly, logic in the translate stage 304 matches the address operand tag for the third micro instruction with the address operand tag for the first micro instruction and thus retrieves the intermediate address operand destined for register ESP from the address distribution bus 316 and provides it to the third micro instruction. Hence, the third micro instruction will proceed into the register stage 306 during cycle 5 already having a valid address operand.

During cycle 4, the first micro instruction proceeds through the data/ALU stage 310. Therein, the push operation is performed to the address computed during cycle 3. Also during cycle 4, the second micro instruction, NOP, proceeds through the address stage 308. In addition during cycle 4, the third micro instruction is allowed to proceed through the register stage 306. Therein, it retrieves the source operand from register EBX. But since a valid address operand corresponding to destination register ESP has already been provided during cycle 3, the third micro instruction does not access register ESP in the register file because it contains stale data. Furthermore, during cycle 4, the fourth macro instruction proceeds through the translate stage 304. Therein it is translated into a fourth micro instruction, designated as POP EAX ESP. Like the first micro instruction, the third micro instruction has an opcode field, POP, a destination register tag, EAX, and a source register tag, ESP. Because a pop operation fetches an operand from the top of the stack and stores it in a destination register, address operand register ESP is prescribed in a POP micro instruction as a source register rather than a destination register. Note that since the fourth micro instruction requires the contents of ESP in order to compute an address for the top of the stack, it also is an address-dependent micro instruction because its address operand depends upon the modification of the stack pointer (ESP) by the third micro instruction.

During cycle 5, the first micro instruction proceeds through the write back stage 312. Therein, register ESP in the register file is provided with a new stack pointer value, as viewed from the standpoint of execution of the first micro instruction. Essentially, it is this value of ESP that the third micro instruction requires to compute an address for the top of stack, however, this address operand was already provided to the third micro instruction during cycle 3 over the address distribution bus 316. Also during cycle 5, the NOP micro instruction proceeds through the data/ALU stage 310. In addition during cycle 5, the third micro instruction proceeds through the address stage 308. Therein, address logic within the address stage 308 employs the address operand provided via the address distribution bus 316 during cycle 3 to generate an address for the top of the stack. Following generation of the top of stack address, the address operand is again modified to point to a new top of stack location. In addition, the address stage 308 places the intermediate address operand out on the address distribution bus 316 so that any dependent micro instructions in previous stages of the pipeline can retrieve it. Consequently, because the fourth micro instruction requires the contents of ESP in order to compute an address for the top of stack, logic in the register stage 306 matches the address operand tag for the fourth micro instruction with the address operand tag for the third micro instruction and thus retrieves the intermediate address operand destined for register ESP from the address distribution bus 316 and provides it to the fourth micro instruction. Hence, the fourth micro instruction will proceed into the address stage 308 during cycle 6 already having a valid address operand.

The micro instructions continue to execute through completion during cycles 6 through 8. A precise description of each of the remaining cycles is not relevant to this discussion other than to note that 1) pipeline slips are not required to be inserted for address-dependent micro instructions when utilizing an address-distribution bus 316, 2) distribution of an intermediate address operand to the third micro instruction, PUSH ESP EBX, occurs during cycle 3, when it proceeds through the translate stage 304, and 3) distribution of another, more recent, intermediate address operand to the fourth micro instruction, POP EAX ESP, occurs during cycle 5, when it proceeds through the register stage 306. Consequently, the address operand distribution technique requires that tag comparison and substitution logic be present within any pipeline stage wherein an address-dependent micro instruction is to be provided with an intermediate address operand, because the address operand is only present on the address distribution bus 316 during the cycle in which it is generated in the address stage 308. Slips are indeed avoided using this technique, albeit at the expense of additional logic.

Figure 5:
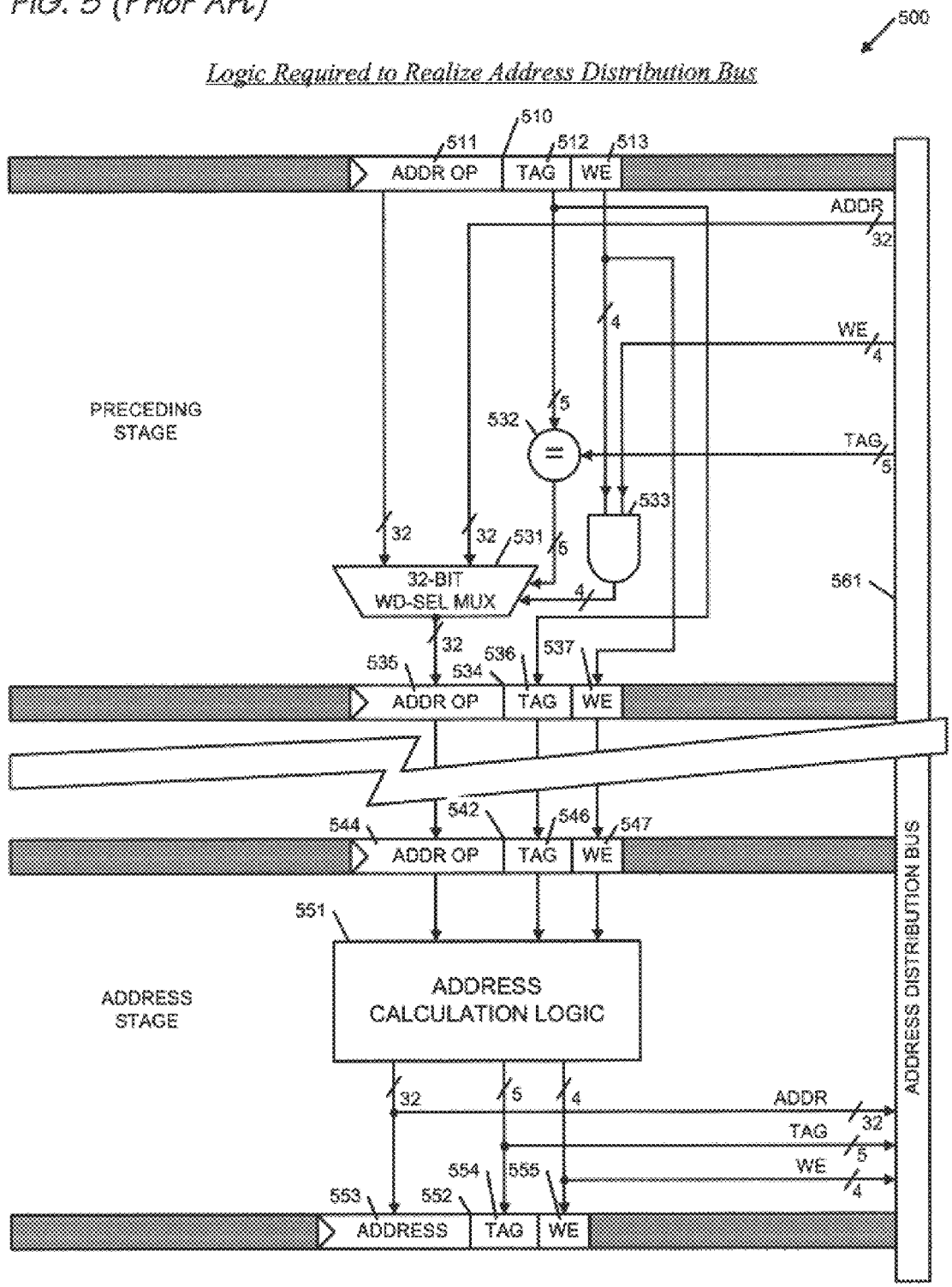
FIG. 5 is a block diagram illustrating address operand distribution logic in a preceding stage of the microprocessor of FIG. 3.

Now referring to FIG. 5, a block diagram 500 is presented illustrating address distribution bus logic in a preceding stage of the microprocessor 300 of FIG. 3. For the microprocessor 300 shown in FIG. 3, the preceding stage can be either the translate state 304 or the register stage 306 to which an intermediate address operand is distributed. For any other microprocessor that employs an address distribution scheme, the preceding stage corresponds to any stage to which intermediate address operands are distributed. The preceding stage includes a tag comparison logic element 532 that is connected to a 32-bit word-selectable mux 531. In addition, a word selector 533 is connected to the mux 531. The mux 531 and word select logic 533 are shown as such in the FIGURE because an x86-compatible microprocessor provides two address modes of operation: 16-bit address mode and 32-bit mode. A micro instruction executing in 32-bit address mode will require a full 32-bit address operand whereas only a 16-bit address operand is used for instructions executing in 16-bit address mode. One skilled in the art will appreciate that, although an x86-compatible address distribution scheme is depicted in the block diagram 500, it is exemplary of that employed by a typical present day microprocessor. The block diagram 500 also address calculation logic 551 in the address stage for generating an intermediate address operand. The 15 intermediate address operand is routed to address register 552 and an address distribution bus 561. The address distribution bus 561 provides the intermediate address operand to the preceding stage.

Operationally, the address operand associated with a micro instruction is piped to successive stages of the microprocessor via address operand registers 510, 534, 542, and 552. When an interim address distribution scheme is employed, each of the address operand registers 510, 534, 542 up to the address stage, in addition to providing address operand fields 511, 535, 544, must also carry along tag fields 512, 536, 546 so that their address operand tags can be compared to an intermediate address operand's tag. As was alluded to with reference to FIG. 4, an address operand is prescribed in either a source operand field or a destination operand field of a particular micro instruction. For clarity of discussion, the logic required to distribute an interim address operand to either a source or destination operand register is not shown. One skilled in the art will appreciate however, that addition logic to perform this function is required for those microprocessor architectures that allow prescription of address operands in either source or destination operand fields. In addition, each address operand register 510, 534, 542, 554 also has a word-enable field 513, 537, 547, 555 to indicate which words from a multi-word operand field 511, 535, 544, 553 are required for associated operands. As was noted above, macro instructions for an x86-compatible microprocessor can specify two address operand sizes: 16-bit and 32-bit. Assuming that 32-bit registers in a register file are provided in the microprocessor to accommodate up to 32-bit operands, then when a micro instruction only specifies a 16-bit address operand, it must retrieve only the lower word of the corresponding 32-bit register in the register file. Because of this, operand size must be indicated for both address-dependent operands and intermediate address operands so the proper bytes of an intermediate address operand are distributed and substituted in the preceding stage. Although the ensuing discussion is directed to address operand distribution in a 32-bit x86-compatible microprocessor as described above, one skilled in the art will appreciate that the discussion is applicable to most any present day microprocessor.

The address calculation logic 551 retrieves an address operand from register 542 and calculates an address as prescribed by an associated micro instruction. If the associated micro instruction is a stack manipulation instruction, a string instruction, or any other applicable micro instruction, the address logic 551 also changes the value of the address operand to reference a next location. For stack manipulation instructions, the next location is a new top of stack, typically referenced by register ESP. For string instructions, the new location is either a new source location, typically referenced by register ESI, or a new destination location, typically referenced by register EDI. This intermediate address operand is provided to the address register 552 and additionally to the address distribution bus 561. The address register 552 has an address operand field 553 that contains the intermediate address operand. The address register 552 also has a tag field 554 that designates the destination register in the register file (not shown) for the intermediate address operand. The address register 552 additionally has a word-enable field 555 that indicates which words of the intermediate address operand are valid, that is, whether the intermediate address operand is 16-bits or 32-bits in size.

The intermediate address operand, the tag, and the associated word-enable indicator are routed to the preceding stage over the address distribution bus 561. Within the preceding stage, the intermediate address operand is provided to mux 531. The tag is routed to tag comparison logic elements 532. The word-enable indicator is routed to word selector 533. When the tag matches the tag from field 512 then the mux 531 is enabled to substitute the intermediate address operand for contents of the address operand field 511. In addition, the word selector 533 enables substitution only for words required for the address-dependent operand. For example, suppose the intermediate address operand is a 32-bit data element that is destined for register ESI in the register file. Further suppose that an address-dependent micro instruction in the preceding stage prescribes its address operand as also from register ESI, and that it is a 16-bit operand. Hence, tag comparison element 532 will indicate a tag match, thus enabling the 32-bit mux 531. The word-selector 533, however, will only allow substitution of the lower 16-bits of the intermediate address operand. Alternatively, suppose the intermediate address operand is a 16-bit data element that is destined for register ESP in the register file. Further suppose that an address-dependent micro instruction in the preceding stage prescribes its address operand also from register ESP, and that it is a 32-bit operand. Hence, tag comparison element 532 will indicate a tag match, thus enabling the 32-bit mux 531. The word-selector 533, however, will only allow substitution of the lower 16-bits of the intermediate address operand, because, although the address-dependent micro instruction requires a 32-bit address operand, only the lower 16 bits of it have been modified by a micro instruction in the address stage.

One skilled in the art will appreciate that the 32-bit x86-compatible example of address distribution shown in FIG. 5 does not necessarily have to employ the specific types of logic elements 531, 532, 533 shown in the figure, however, to implement address distribution, logic that is equivalent in function to those elements 531, 532, 533 must be used.

Three points are noted about address distribution techniques. First, the logic required to distribute intermediate address operands must be present within every preceding stage. Second, the time to setup and distribute an intermediate address operand to the preceding stages is driven by the preceding stage that is farthest in distance away from the address stage on the physical microprocessor integrated circuit. Third, the drive strength required of logic elements to distribute the intermediate address operands is based upon the number of stages to which the intermediate address operands are provided.

The address distribution technique has sufficed for a few generations of pipeline microprocessors, primarily because the number of logic devices required and the associated timing and drive strength requirements were tolerable. Nonetheless, two issues regarding newer generations of pipeline microprocessors are now forcing microprocessor designers to rethink address distribution as a means for expediting the execution of address-dependent micro instructions. First, advances in integrated circuit design and fabrication techniques are allowing microprocessor designs to be scaled to the sub-micron level. Scaled designs run faster and use less power because the logic elements are smaller and the signal paths are shorter. But scaling tends to precipitate timing-related and power-related problems in a scaled design that would not otherwise be manifest. Second, to increase throughput, newer microprocessor designs exhibit more pipeline stages that perform fewer functions within each stage. Because fewer functions are performed in each stage, less time is required to perform the functions in each stage, thereby allowing additional increases in clock speeds. But decreasing the functions in one stage, say cutting functional requirements in half, requires an additional stage to perform the other half of the required functions. So, whereas the last generation of pipeline microprocessors consisted of, say, six pipeline stages operating at 200 MHz, the next generation of pipeline microprocessors consists of, say, 12 stages that operate at 500 MHz. The speed increase is due both to pipeline stage architectural changes and to scaling effects. This trend is expected to continue in the art.

To reiterate the three points noted above regarding interim address operand distribution: 1) the number of logic elements required to implement address operand distribution is proportional to the number of preceding stages to which intermediate address operands are distributed; 2) the timing considerations for distributing intermediate address operands are a function of distance from the stage that generates the intermediate address operand; and 3) the power required of drivers to distribute intermediate address operands is also proportional to the number of preceding stages. Consequently, the examples discussed with reference to FIGS. 1 through 5 show that increasing the number of stages in a microprocessor design reveals the deficiencies inherent in the address operand distribution technique. To implement address operand distribution in a microprocessor with more stages requires an inordinately complex configuration of logic devices having associated routing complexities, timing concerns, and power issues. In essence, address operand distribution is a technique that is not suited for more advanced pipeline architectures.

The present invention overcomes the limitations of address operand distribution by providing a means whereby several intermediate address operands are retained, thereby allowing an address-dependent micro instruction to access the intermediate address operands only one time, in a pipeline stage immediately preceding the stage in which an address operand is required. The design of a microprocessor according to the present invention is much less complex, it requires less power, and it does not present timing problems. The present invention is now discussed with reference to FIGS. 6 through 8.

Figure 6:
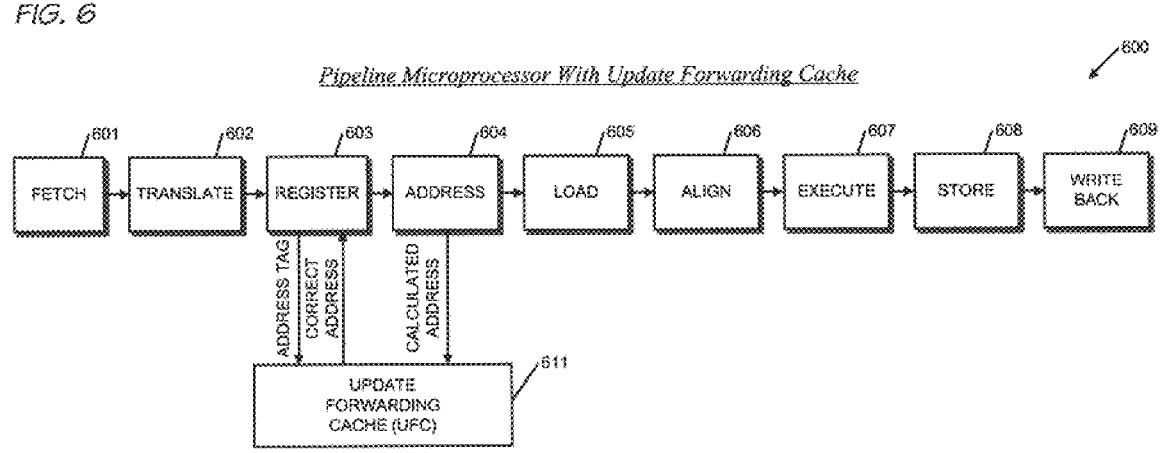
FIG. 6 is a block diagram of a microprocessor according to the present invention featuring an update forwarding cache.

Now referring to FIG. 6, a block diagram is presented of a microprocessor 600 according to the present invention featuring an update forwarding cache 611. The microprocessor 600 includes a fetch stage 601, translate stage 602, register stage 603, address stage 604, load stage 605, align stage 606, execute stage 607, store stage 608, and write back stage 609. In addition, the microprocessor 600 includes an update forwarding cache 611 that is coupled to the register stage 603 and the address stage 604. As was alluded to earlier, the microprocessor 600 according to the present invention exhibits more pipeline stages 601–609 than earlier designs. More specifically, the microprocessor 600 has seven stages 603–609 in its execute pipe as compared to four stages shown for the microprocessors 100, 300 of FIGS. 1 and 3. The stages 601–609 in the microprocessor each perform fewer functions, thus providing for faster clock speeds.

In operation, the fetch stage 601 fetches instructions from memory (not shown) that are to be executed by the microprocessor 600. The translate stage 602 sequentially translates; the fetched instructions into associated micro instructions. The register stage 603 retrieves operands specified by the micro instructions from a register file (not shown) for use by subsequent stages in the pipeline. In addition, address-dependent micro instructions proceeding through the align stage 616 access intermediate address operands in the update forward cache 611, or intermediate address operand cache 611, to retrieve and configure dependent address operands. The address stage 604 calculates memory addresses specified by the micro instructions to be used in data storage and retrieval operations. In addition, for stack manipulation, string, and other applicable instructions, the address stage 604 modifies address operands so that they correctly reflect execution of the micro instruction therein. These intermediate address operands are provided to the update forward cache 611 along with associated register and byte-enable tags. The load stage 605 reads cache lines from memory to load operands using the address generated in the address stage 604. The align stage 606 extracts the operands from the retrieved cache lines and aligns the operands for execution. The execute stage 607 performs ALU operations to generate results. The store stage 608 writes either results or operands to memory using the address calculated in the address stage 604. The write back stage 609 updates registers in the register file with the results generated in the execute stage 607 or with operands retrieved from memory by the load stage 605.

The update forwarding cache 611 is an array of storage elements for storing multiple intermediate address operands and associated tag information for a corresponding number of preceding micro instructions, that is, the number of previously modified intermediate address operands which are required to configure and provide an address operand to an address-dependent micro instruction proceeding through the register stage 603. Since more than one intermediate address operand may be destined for the same register in the register file, the update forwarding cache 611 also maintains information for each intermediate address operand indicating its relative priority for substitution purposes. In one embodiment, the update forwarding cache 611 contains four storage elements corresponding to four preceding intermediate address operands. Thus, when a micro instruction proceeds through the register stage 603, its address operand register tag is provided to the update forwarding cache 611. The update forwarding cache 611, in turn, configures an address operand from the most recently generated words of intermediate address operands therein whose register tags match the provided register tag. In addition, the update forwarding cache 611 provides address operand words in accordance address mode (i.e., 16-bit or 32-bit) that is specified.

In a microprocessor 600 according to the present invention, an address-dependent micro instruction updates its address operand only in the stage 603 immediately preceding the address stage 604. Therefore, timing, routing, and drive strength issues are eliminated because intermediate address operands need be provided only to a single-pipeline stage 603 which is physically close to the address stage 604 on the integrated circuit. The growth versus complexity issue is also addressed by the present invention because increasing the number of stages in a microprocessor 600 according to the present invention would only require that the number of storage elements in the update forwarding cache 611 be increased. The addition of more complex logic elements to new stages of the microprocessor 600 is not required.

Figure 7:
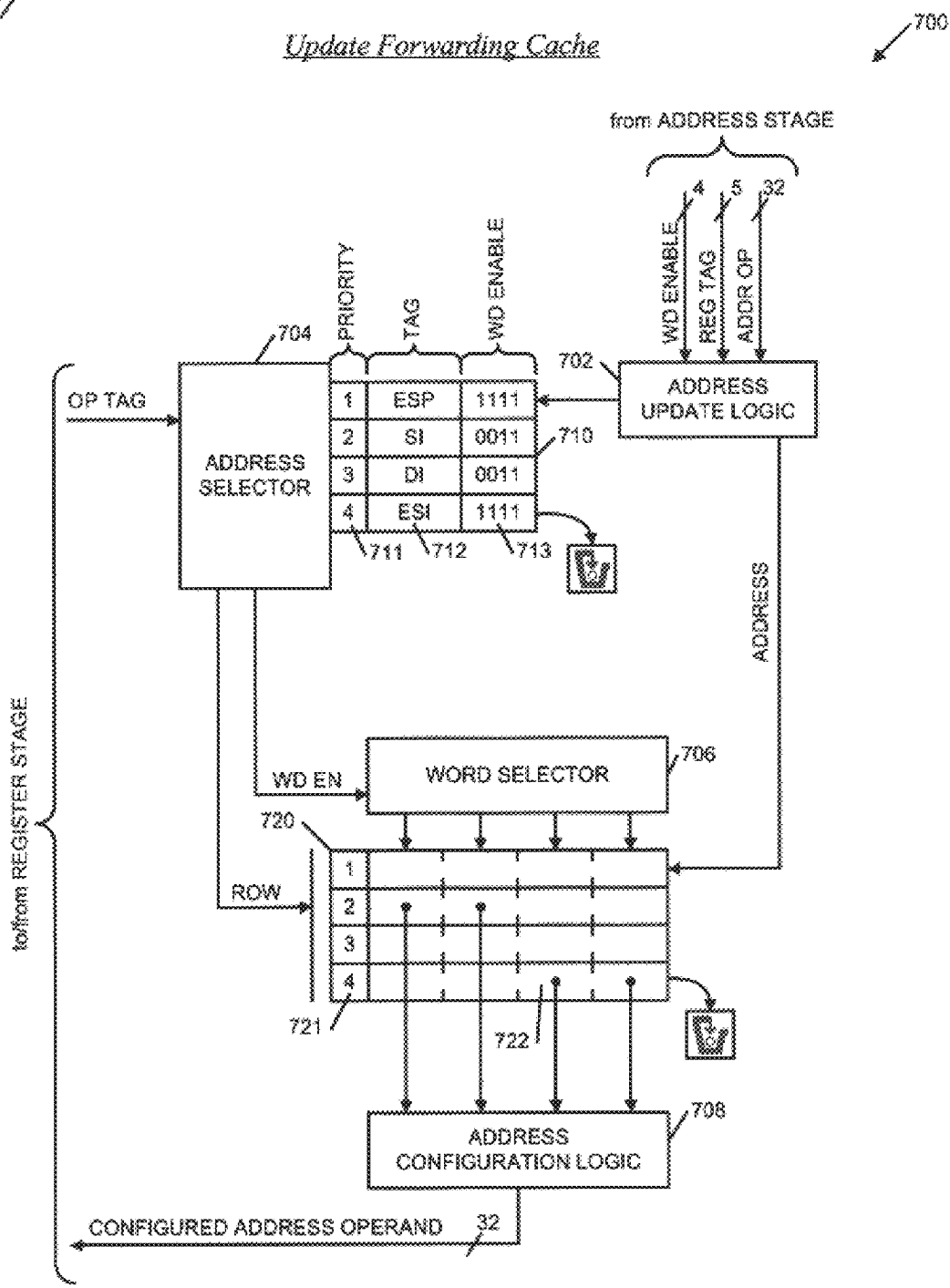
FIG. 7 is a block diagram illustrating details of an update forwarding cache according to the present invention

Now referring to FIG. 7, a block diagram is presented illustrating details of an update forwarding cache 700 according to the present invention. In one embodiment, the update forwarding cache 700 has an address selector 704 that receives an address operand tag from an address-dependent micro instruction in the register stage of a microprocessor according to the present invention. The address operand tag comprises data designating a corresponding address operand register in a register file along with data prescribing the address operand size (i.e., 16-bit or 32-bit). The address selector 704 is coupled to a tag array 710. Entries in the tag buffers 710 each have an intermediate address operand priority field 711, an intermediate address operand register field 712, and a word enable field 713. The tag array 710 receives its entries from update logic 702. The update logic 702 is coupled to address stage logic in a microprocessor according to the present invention.

The update logic 702 provides intermediate address operands to an intermediate address operand array 720 having entries that correspond to entries in the tag array 710. Each entry in the intermediate address operand array 720 has a priority field 721 and an intermediate address operand field 722.

The intermediate address operand array 720 is indexed by the address selector 704 and a word selector 706. Outputs from the intermediate address operand buffers 720 are provided to address operand configuration logic 708. The operand configuration logic 708 provides a configured address operand back to the micro instruction in the register stage.

Operationally, each time the address stage logic executes a micro instruction that generates an intermediate address operand, ADDR OP, it is provided to the update logic 702 along with a corresponding address operand register tag, REG TAG, and a size specifier, WD ENABLE. ADDR OP is written to a most recently generated entry in the intermediate address operand array 720, in this embodiment, the entry having priority field 721 equal to 1. In parallel, the tag and size specifiers are written to the corresponding most recently generated entry in the tag array 710 (priority 1). When a new intermediate address operand is entered into the update forwarding cache 700, contents of the tag array 710 and intermediate address operand array 720 are manipulated such that a least recently generated intermediate address operand and corresponding tag and size specifiers are cast out or the arrays 710, 720. One skilled in the art will appreciate that manipulating the array contents is just one embodiment available for indicating priority. In an alternative embodiment, the least recently generated address operand and data is simply overwritten by the most recently generated address operand and the priority fields 711, 721 are modified. Thus, the four most recently generated intermediate address operands are maintained in the embodiment of the update forwarding cache 700 presented in FIG. 7. For example, contents of the tag array 710 indicate that the most recently generated intermediate address operand (i.e., priority 1) comprises 32-bit intermediate address operand corresponding to register ESP in the register file. The intermediate address operand corresponding to priority 2 (i.e., the intermediate address operand generated prior to the priority 1 intermediate address operand) comprises both a 16-bit intermediate address operand corresponding to register SI in the register file. The priority 3 intermediate address operand is a 16-bit address operand destined for register DI.

In one embodiment, when a micro instruction proceeds through the register stage, its address operand tag, OP TAG, is provided to the address selector 704. The address selector 704 evaluates tag array entries to select the most recently written intermediate address operand bytes that have corresponding registers matching the operand's address operand tag. In addition, bytes are selected based upon the size of the specified address operand and that of the intermediate address operands. In one embodiment, the address selector 704 enables bytes in the intermediate address operand array 720 for configuration of the address operand by providing row and column information via the WD EN, and ROW signals.

The enabled bytes in the intermediate address operand array 720 are passed to the address configuration logic 708. The address configuration logic 708 assembles the enabled bytes into the address operand and provides the operand to the address-dependent micro instruction in the register stage. One skilled in the art will appreciate that increasing the number of stages in a microprocessor according to the present invention requires only additional entries in the tag array 710 and intermediate address operand array 720. Neither timing nor power requirements for the update forwarding cache 700 would be notably affected.

Now referring to FIG. 8, table 800 is presented illustrating execution of an address-dependent micro instruction by the microprocessor 600 of FIG. 6. Four macro instructions, a first macro instruction, designated PUSH EBX, a second macro instruction, designated NOP, a third macro instruction, also designated NOP, a fourth macro instruction, designated POP EAX, are shown in the Translate column of the table 800. The particular operations are like those specified by similar instructions discussed with reference to FIG. 4. Thus, since both the PUSH and POP instruction both require access to a stack pointer in register ESP, an address-dependency case is illustrated. The second and third macro instructions are NOP instructions. For clarity of discussion, a column corresponding to the fetch stage 601 is not shown. The marks *** designate instructions before or after the instructions of interest. Progression of instructions through noted stages of the pipeline is shown with respect to cycles of a pipeline clock.

During cycle 1, the first macro instruction, PUSH EBX, proceeds through the translate stage 602. Therein, the first macro instruction is decoded into a first micro instruction, designated as PUSH ESP EBX. The first micro instruction prescribes a destination tag, ESP, and a source tag, EBX.

During cycle 2, the first micro instruction proceeds through the register stage 603. Therein, an address operand and a source operand are retrieved from registers ESP and EBX in the register file. Also during cycle 2, the second macro instruction, NOP proceeds through the translate stage 602. Therein it is translated into an associated second micro instruction, designated as NOP.

During cycle 3, the first micro instruction proceeds through the address stage 604. Therein, address logic within the address stage 604 uses the address operand fetched from register ESP to generate an address for the top of the stack. In addition, the address operand corresponding to register ESP is modified to indicate a new top of stack location. This modified address operand, along with register tag and word enable data, is written to an update forwarding cache according to the present invention. Also during cycle 3, the second micro instruction, NOP, proceeds through the register stage 603. In addition during cycle 3, the third macro instruction, NOP, proceeds through the translate stage 602 wherein it is decoded into a third micro instruction, designated as NOP.

During cycle 4, PUSH ESP EBX proceeds through the load stage 605. Also during cycle 4, the second micro instruction proceeds through the address stage 604. In addition during cycle 4, the third micro instruction, NOP, proceeds through the register stage 603. Furthermore during cycle 4, the fourth macro instruction proceeds through the translate stage 602 and is decoded into a corresponding micro instruction, designated as POP EAX ESP. Note that the POP instruction requires access to the stack pointer register (i.e., register ESP) contents which have been modified as a result of the first micro instruction proceeding through the address stage 604. But since the modified address operand has been written to the update forwarding cache 611 by logic in the address stage 604, the POP instruction is allowed to proceed to the next pipeline stage 603 even though register ESP has not been updated. Also note that the POP instruction is allowed to proceed without a requirement for address operand distribution logic. It is designated as an address-dependent micro instruction so that it will access the update forwarding cache 611 when it proceeds through the register stage 603.

During cycle 5, the four micro instructions proceed into their next corresponding stage in the pipeline. It is significant to note that the POP instruction accesses the update forwarding cache 611 during this clock cycle to retrieve an updated stack pointer. The register tag for the POP instruction is provided to the update forwarding cache 611, which in turn configures and provides an updated stack pointer to the POP instruction. Thus the POP instruction will enter the address stage 604 having a valid address operand. Execution of the address-dependent POP instruction is expedited without a requirement for complex address operand distribution logic.

During cycles 6 through 11, the four micro instructions proceed through successive pipeline stages until they complete execution. For purposes of this application, the significant events occur as the instructions pass through the register and address stages 603, 604 for these are the stages that are affected by implementation of the update forwarding cache 611.

The present invention provides a means for expediting the execution of an address-dependent micro instruction that supports more advance pipeline designs, specifically those that exhibit more pipeline stages. In addition, the update forwarding cache allows address-dependent micro instructions to access all needed intermediate address operands in a single pipeline stage, thereby eliminating the requirements for complex address operand distribution logic in multiple pipeline stages.

Although the present invention and its objects, features, and advantages have been described in detail, other embodiments are encompassed by the invention. For example, the present invention has been particularly characterized in terms of a microprocessor pipeline comprising seven stages in an execute pipe. Although a seven-stage execute pipe is representative of most present day architectures, the present invention is not restricted by this configuration. As alluded to above, more or less stages in the execute pipe simply drives the number of intermediate address operand and corresponding register tag entries that are required to be in the update forwarding cache.

In addition, the present invention has been characterized in terms of x86-compatible stack and string instructions for execution on an x86-compatible microprocessor. It is noted, however, that the present invention comprehends any microprocessor, array processor, micro controller, signal processor, or similar device that processes instructions having address operands which are modified as a result of execution of those instructions.

Moreover, the present invention comprehends microprocessor architectures that are different than the 32-bit embodiment described herein. A 64-bit, or even a 128-bit update forwarding cache is comprehended by an embodiment having a modified address operand size indicator and intermediate address operand array.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor apparatus for providing an address operand to an address-dependent micro instruction, the microprocessor apparatus comprising:

an update forwarding cache, configured to store intermediate address operands;

address update logic, coupled to said update forwarding cache, configured to enter said intermediate address operands into said update forwarding cache; and address configuration logic, coupled to said update forwarding cache, configured to access said intermediate address operands to provide the address operand required by the address-dependent micro instruction.

2. The microprocessor apparatus as recited in claim 1, wherein said intermediate address operands are operands that have been generated by preceding micro instructions, but which have not yet been written to corresponding address operand registers in a register file for access by following micro instructions.

3. The microprocessor apparatus as recited in claim 2, wherein said address configuration logic configures said address operand from said intermediate address operands in said update forwarding cache and provides said address operand to the address-dependent micro instruction prior to when said address operand is required for calculation of an address associated with the address-dependent micro instruction.

4. The microprocessor apparatus as recited in claim 3, wherein said update forwarding cache comprises cache buffers, each of said cache buffers corresponding to each of said intermediate address operands.

5. The microprocessor apparatus as recited in claim 4, comprising four cache buffers that correspond to four intermediate address operands generated by four preceding micro instructions.

6. The microprocessor apparatus as recited in claim 4, wherein said each of said cache buffers comprises:
  an address field, for storing a corresponding intermediate address operand generated by execution of a corresponding preceding micro instruction;
  a tag field, for identifying a corresponding address operand register in said register file into which said corresponding intermediate address operand is to be entered; and
  a word enable field, for designating words in said address field that are valid when said corresponding intermediate address operand is entered into said update forwarding cache.

7. The microprocessor apparatus as recited in claim 6, wherein said address configuration logic configures said address operand from selected cache buffers having tag field contents that each designate a first address operand register in said register file, said first address operand register corresponding to said address operand.

8. The microprocessor apparatus as recited in claim 7, wherein said address configuration logic concatenates the most recently entered and valid words from said selected cache buffers to form said address operand.

9. An intermediate address operand cache for storing intermediate address operands calculated by preceding micro instructions, the intermediate address operands being entered into the intermediate address operand cache prior to being entered into a register file, the intermediate address operand cache comprising: address operand buffers, for storing the intermediate address operands;
  tag buffers, coupled to said address operand buffers, each of said tag buffers designating a corresponding register in the register file within which a corresponding intermediate address operand is to be entered;
  valid word indicators, coupled to said address operand buffers, each of said valid word indicators indicating which words in a corresponding intermediate address operand buffer are valid upon entry of said corresponding intermediate address operand;
  a word selector, coupled to said tag buffers and said valid word indicators, for determining selected word locations within selected address operand buffers that are used to configure an address operand for an address-dependent micro instruction; and
  address operand configuration logic, coupled to said word selector and said address operand buffers, for retrieving words from said selected word locations within said selected address operand buffers to configure said address operand.

10. The intermediate address operand cache as recited in claim 9, wherein said address operand configuration logic configures said address operand and provides said address operand to said address-dependent micro instruction after said address-dependent micro instruction has accessed an address operand register in the register file and prior to when said address-dependent micro instruction requires said address operand for calculation of an address.

11. The intermediate address operand cache as recited in claim 10, wherein the number of said address operand buffers, said tag buffers, and said valid word indicators correspond to intermediate address operands generated by four preceding micro instructions.

12. The intermediate address operand cache as recited in claim 11, wherein said four preceding micro instructions comprise x86-compatible micro instructions.

13. The intermediate address operand cache as recited in claim 11, wherein said four preceding micro instructions are stack manipulation instructions (i.e., PUSH/POP) or string instructions.

14. The intermediate address operand cache as recited in claim 12, wherein each time a most recently generated intermediate address operand is entered into a most recently generated intermediate address operand buffer, contents of the intermediate address operand cache are shifted such that a least recently generated intermediate address operand is shifted out of a least recently generated intermediate address operand buffer.

15. The intermediate address operand cache as recited in claim 14, wherein said word selector determines said selected address operand buffers based upon contents of corresponding selected tag buffers which each designate said address operand register.

16. The intermediate address operand cache as recited in claim 15, wherein said address operand configuration logic concatenates the most recently entered and valid words from said selected address buffers to form said address operand.

17. An apparatus in a pipeline microprocessor for providing an address operand to an address-dependent micro instruction, the apparatus comprising:
  address calculation logic, for generating intermediate address operands corresponding to micro instructions that precede the address-dependent micro instruction;
  address operand cache entries, for storing said intermediate address operands;
  address update logic, coupled to said address calculation logic and said address operand cache entries, for entering a specific intermediate address operand into a specific address operand cache entry following calculation of said specific intermediate address operand by said address logic and prior to said specific intermediate address operand being written to a specific address operand register in a register file; and
  address operand configuration logic, coupled to said address operand cache entries, for selecting words from selected address operand cache entries to configure the address operand.

18. The apparatus as recited in claim 17, wherein the number of address operand cache entries correspond to four of said intermediate address operands generated by four of said micro instructions that precede the address-dependent micro instruction.

19. The apparatus as recited in claim 18, wherein said micro instructions comprise x86-compatible micro instructions.

20. The apparatus as recited in claim 19, wherein said x86-compatible micro instructions comprise stack manipulation instructions (i.e., PUSH/POP) or string instructions.

21. The apparatus as recited in claim 20, wherein each instance a most recently generated intermediate address operand is entered into a most recently generated intermediate address operand cache entry, a least recently generated intermediate address operand is cast out of a least recently generated intermediate address operand cache entry.

22. The apparatus as recited in claim 21, wherein said selected address operand cache entries are selected if their associated address operand register is the same register in said register file that the address-dependent micro instruction prescribes for the address operand.

23. The apparatus as recited in claim 22, wherein said address operand configuration logic selects the most recently entered and valid words from said selected address operand cache entries to form the address operand.

* * * * *